April 28, 1970  E. C. CARLSON  3,508,385
MULTI-BLADE ROTARY MOWER
Filed Oct. 30, 1967  2 Sheets-Sheet 1
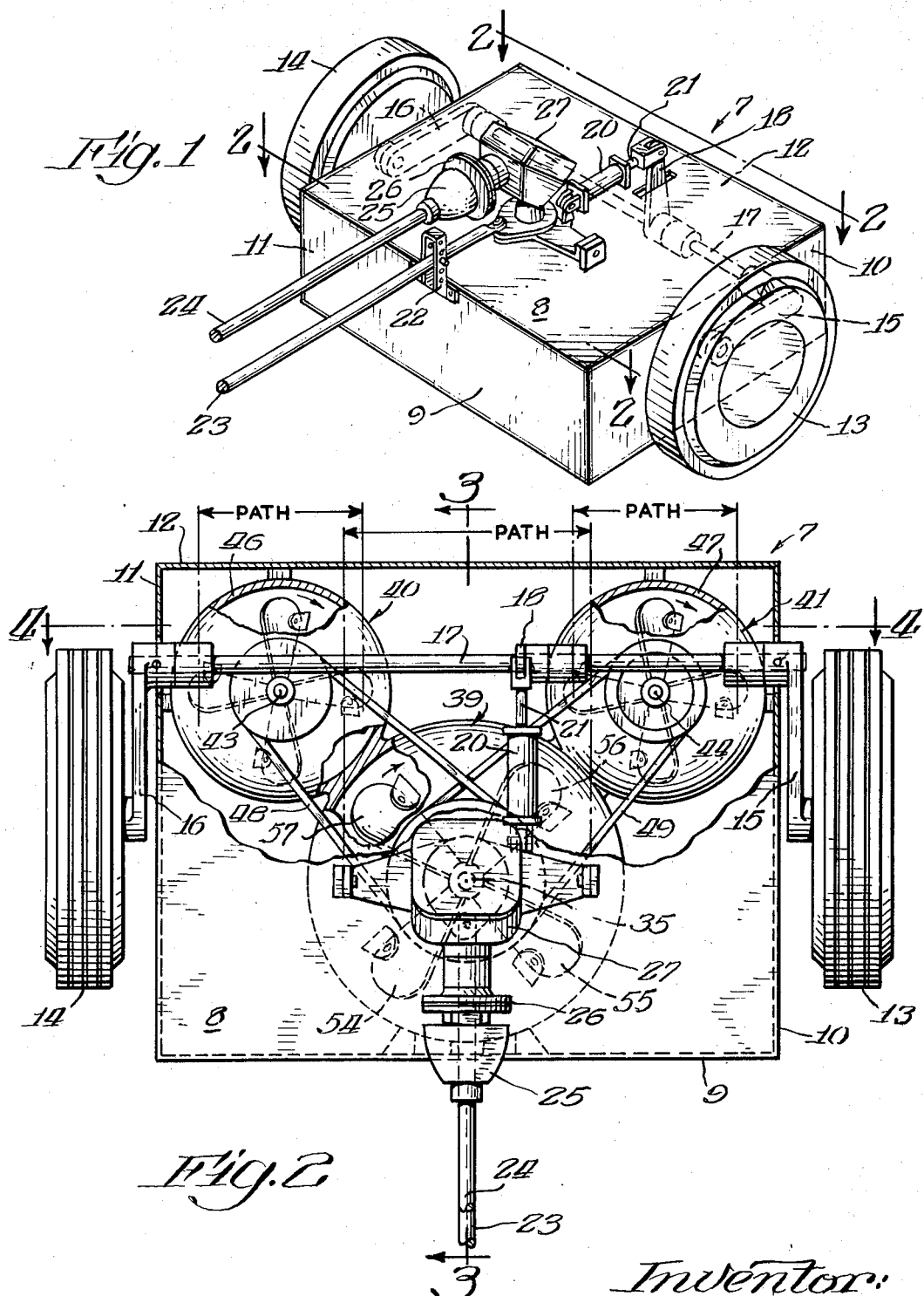

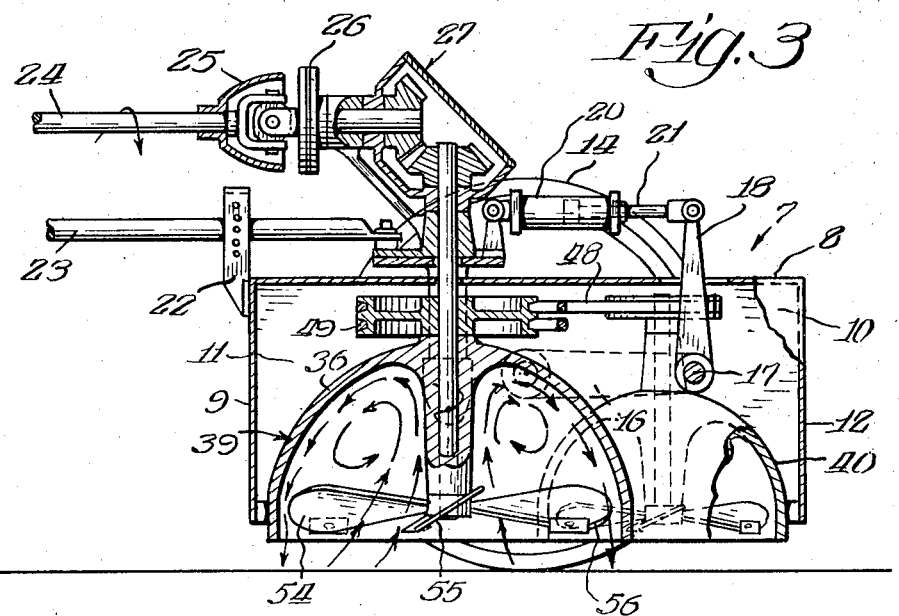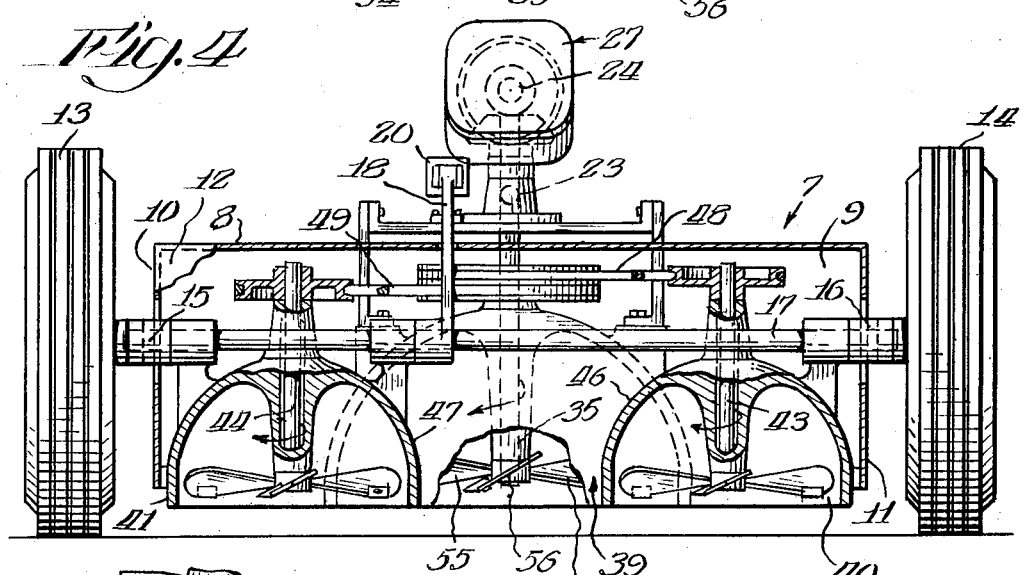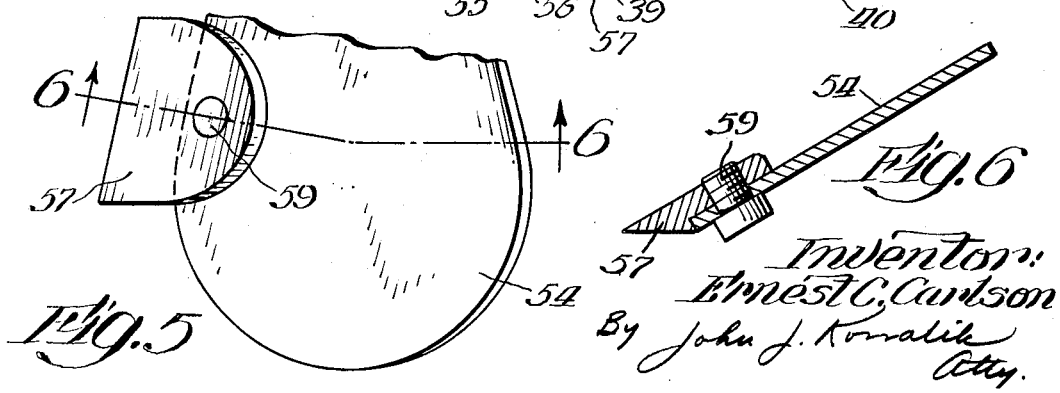

United States Patent Office 3,508,385
Patented Apr. 28, 1970

3,508,385
MULTI-BLADE ROTARY MOWER
Ernest C. Carlson, Hinsdale, Ill., assignor to International Harvester Company, Chicago, Ill., a corporation of Delaware
Filed Oct. 30, 1967, Ser. No. 678,879
Int. Cl. A01d 35/26
U.S. Cl. 56—25.4                                1 Claim

ABSTRACT OF THE DISCLOSURE

A rotary mower is provided with fan blades and cutting elements mounted for rotation about a vertical drive shaft within a protective housing, the fan blades being adapted for developing a strong updraft generally parallel to the axis of blade rotation without concurrently developing significant lateral air movement so that all materials to be cut are urged upwardly for cutting at a uniform and even height. The protective housing for the mower is preferably of a generally hemispherical or dome-like interior contour, and is arranged with respect to the fan blades so that the upwardly directed air and the cut materials carried thereby are deflected outwardly and down the curved interior surface of the housing to discharge downwardly about the annular periphery of the housing. Other features are disclosed.

INTRODUCTION

The present invention relates generally to mowers and, more particularly, to new and improved rotary mowers of a type especially well suited for heavy duty cutting operations.

SUMMARY OF THE INVENTION

It is a primary object of the present invention to provide a rotary mower construction having fan blades for developing substantially only a vertical airflow relative to the ground surface so that the materials to be cut are not bent down by the action of the mower blades but rather are urged upwardly into the path of the cutting elements to effect cutting at a uniform, preselected height.

It is another object of the present invention to provide, in conjunction with a rotary mower of the foregoing type, a housing of a dome-like contour which results in the cut materials being deflected outwardly to discharge in a vertically downward direction about the annular periphery of the housing, thereby substantially eliminating the problems normally incident to the use of mowers of the lateral-discharge type.

It is still another object of the present invention to provide an improved heavy duty rotary mower construction which is less susceptible to clogging and plugging than prior art construction but which still provides an effective mulching of the cut materials prior to discharge.

It is a further object of the present invention to provide a rotary mower construction which affords significant structural and operational features for the safety and protection of the operator.

It is yet another object of the present invention to provide a multi-blade rotary mower construction adaptable for use in multiple mower assemblies in which detrimental interaction between the blades of the adjacent mower assemblies is effectively obviated.

Accordingly, the present invention is directed to a rotary mower having drive means including a drive shaft mounted for rotation about a vertical axis of a protective housing. Cutting means including a plurality of fan blades are affixed to the drive shaft for rotation therewith within the confines of the housing. The natural contour of the fan blades is such as to develop substantially only a vertical airflow relative to the ground so that materials to be cut only incur a positive force tending to urge them upwardly into the path of the cutting means. Preferably, the protective housing is of a dome-like contour, as seen clearly in FIGURE 3, for deflecting the upward airflow and cut materials carried thereby laterally outward along the curved interior surface of the housing to discharge downwardly about the annular periphery of the housing.

BRIEF DESCRIPTION OF THE DRAWINGS

The features of the present invention which are believed to be novel are set forth with particularity in the appended claims. The invention together with further objects and advantages thereof may best be understood, however, with reference to the following description taken in connection with the accompanying drawings in the several figures of which like reference numerals identify like elements and in which:

FIGURE 1 is a perspective view of a rotary mower embodying the present invention;

FIGURE 2 is a plan view, partly in section, of the rotary mower of FIGURE 1;

FIGURE 3 is a cross-sectional view taken along lines 3—3 of FIGURE 2;

FIGURE 4 is a cross-sectional view taken along lines 4—4 of FIGURE 2;

FIGURE 5 is an exploded view of a portion of a fan blade and an associated cutting element of the rotary mower;

FIGURE 6 is a sectional view taken along lines 6—6 of FIGURE 5.

DESCRIPTION OF THE PREFERRED EMBODIMENT

Referring now to FIGURES 1 and 2, the rotary mower assembly there illustrated comprises an exterior support housing or cover 7 of rectangular configuration. The cover 7 includes a planar top surface 8 and four depending wall portions of which a front wall 9 and a sidewall 10 are visible in FIGURE 1. A top view of an opposite sidewall 11 and of a backwall 12 of the housing is provided in FIGURE 2.

The exterior housing 7, and the mower generally, is carried a predetermined distance above the ground by a pair of wheels 13 and 14 disposed on opposite lateral sides of the housing. The wheels 13 and 14 are journaled on respective lever arms 15 and 16 of an axle mechanism which axle mechanism further includes an integral axle bar 17 extending between and through suitable apertures in the opposite sidewalls 10 and 11.

The wheels 13 and 14 are raised and lowered relative to the housing 7 to adjustably establish a desired cutting height by pivotal movement of a third lever arm 18 rigidly affixed to axle bar 17 at a point intermediate its opposed ends. The lever arm 18 projects upwardly through an elongated slot in the top surface 8 of the housing and is operated under the influence of a hydraulic control cylinder 20 mounted to the top cover 8 of the housing. Specifically, a piston rod 21 of the cylinder 20 is pivotally connected to the lever arm 18 and upon longitudinal movement of the piston arm 21 the wheels 13 and 14 are shifted either up or down relative to the housing. The hydraulic fluid lines (not shown) for the control cylinder 20 are coupled to an operating lever on a towing vehicle (also not shown) for the mower in conventional fashion. At the selected cutting height, the mower is leveled with respect to the ground by a key and slot mechanism 22 in conjunction with a hitch or tow bar 23, the latter also being adapted for connection to the towing vehicle (not shown) in a conventional manner.

The rotary mower is not self-powered, but rather its cutting blades are driven from a power take-off of the towing vehicle (not shown). The power take-off connects to the rotary mower through drive means including a horizontal shaft 24, a universal coupling 25, a slip clutch 26 and a pair of beveled gears enclosed within the main drive gear housing 27.

As may be appreciated by reference to FIGURE 3, the drive means further includes a primary drive shaft 35. The drive shaft 35 extends along a predetermined vertical axis of a primary interior housing means 36; as will presently be explained, the housing 36 defines a protective enclosure for the cutting blades of a primary mower assembly. In this regard, the rotary mower of the present embodiment actually comprises three separate but similar mower assemblies, namely, a primary mower assembly 39 and smaller secondary mower assemblies 40 and 41 (FIGURES 2 and 4) which are respectively offset on opposite lateral sides of the primary mower assembly 39. The secondary mower assemblies include respective central drive shafts 43 and 44 journaled in centrally disposed vertical bearings of their associated interior housing means 46 and 47. The drive shafts 43 and 44 are driven at a like speed from the main drive shaft 35 by drive belts 48 and 49 which are conected between a main drive pulley of the shaft 35 and respective driven pulleys of the secondary drive shafts 43 and 44.

For reasons that will be more fully explained hereinafter, each of the housing means 36, 46 and 47 of the respective mower assemblies is of a generally hemispherical or dome-like contour. The smooth contour of each housing is interrupted only by an integrally cast center bearing for journaling an associated mower drive shaft; the outer surface of each bearing is flared near its uppermost portion to join the upper interior surface of its housing along a curved transition region. In the preferred embodiment, the several mower housings are carried by the exterior housing 7 such that their annular rims lie in a common horizontal plane located somewhat below the lowermost limits of the exterior housing 7. To this end, each of the interior mower housings 36, 46 and 47 is welded to inwardly extending support tabs of the surrounding walls of the cover 7 at an appropriate height relation thereto. The secondary mower assemblies 40 and 41 are also welded to the primary housing 36 along respective tangential rim portions and are further supported by depending tabs of a pair of overhead collars 50 and 51 carried on the axle bar 17.

Referring generally to FIGURES 2-4, each of the three mower assemblies includes cutting means comprising a plurality of fan blades affixed to central drive shafts 35, 43 and 44 of the interior housings 36, 46 and 47, respectively. Since all of the cutting means of the several mower assemblies are identical except for differences in size, only the construction of the primary mower assembly 39 will be explained in detail. Specifically, this assembly comprises four identical fan blades 54-57 which are affixed to the central drive shaft 35 and are disposed thereabout in equally spaced intervals. Each of the blades 54-57 is of a conventional fan blade contour and the blades are collectively adapted for developing substantially only an upward airflow generally parallel to the central vertical axis defined by the drive shaft 35. The precise configuration of the blades and their exact angular pitch are not factors critical to the present invention; these parameters are empirically determined for optimum performance and are dependent upon such factors as cutting diameter, permissible drive shaft loading, the height of the domed housing 36 and the desired rotational speed of the blades. It is required, however, that the fan blades be of such a configuration that they generate little, if any, lateral air movement. It is further required that the blades provide a substantial updraft for all of the adjustable cutting heights of the mower assembly such that the grass or other materials to be cut are urged toward an upright position under the influence of the rotating fan blades.

The leading edge of each of the fan blades 54-57 is provided with a cutting element preferably extending only along a predetermined end portion thereof. An enlarged view of the end portion of the typical fan blade 54 and its associated cutting element 57 is provided in FIGURES 5 and 6. As shown, the cutting element 57 is mounted inboard of the extreme tip of the fan blade 54 such that an uplifting action is provided for the grass or other materials to be cut in advance of the grass actually contacting the cutting element 57. The cutting element 57 is comparatively short in length relative to the fan blade and is removably mounted to the fan blade 54 by a bolt 59 threadably received in a suitable opening of the cutting element. It will be recognized that the foregoing construction facilitates sharpening of the cutting blades as well as prompt replacement of a damaged blade in the field and without return of the mower to a workshop.

In regard to the above, it should be understood that it is unnecessary for the entire leading edge of a fan blade to constitute a cutting surface to have efficient operation of the mower since it has been found that only a small end portion of each rotating blade actually effects a cutting action. The interior portion of the cutting arm is only a carrier for the cutting element and, according to the present invention, also serves as a fan blade for the upward circulation of air.

The operation of the rotary mower of the invention can best be considered by reference to FIGURE 3. Again, only the primary mower assembly 39 is considered in detail, although it is to be understood that the operation of the secondary mower assemblies 40 and 41 is identical. Assuming that the shaft 24 is driven at a suitable rotational speed (e.g. 540 r.p.m.) from the power take-off of the towing vehicle, the fan blades 54-57 are driven at a like rotational speed by the primary drive shaft 35. A very strong updraft is thus created beneath the fan blades tending to lift the grass, etc. to an upright condition. The action of the rotating fan blades is also effective to forcefully thrust the air and the cut materials toward the dome of the interior housing 36 along a path of movement generally parallel to the vertical axis of the drive shaft 35, as schematically indicated by the arrows in the drawing.

The air and cut materials, upon reaching the roof of the dome, are driven outwardly along the curved interior surface thereof and are eventually discharged in a downwardly direction about the annular periphery of the housing 36. However, a substantial portion of the air and materials are recirculated in a swirling pattern, indicated by the arrows in the drawing, thereby developing a fine mulch before the materials are eventually directed to the curved wall of the housing and discharged downwardly as aforesaid. Since the entire annular region between the interior surface of the housing and the outer tips of the fan blades is utilized as a discharge surface, its area is considerably larger than that of a conventional side port housing opening. Hence, there is considerably less likelihood of clogging or plugging of the housing with cut materials and resultant stalling of the mower.

The rate of discharge of materials and degree of mulching is determined in part by the spacing of the outer tips of the fan blades from the interior surface of the housing. This spacing is preferably relatively large in comparison to more conventional rotary mowers to provide an appropriate discharge region. Furthermore, because of the strong uplifting force developed by the fan blades and the manner in which cut materials are handled, it is possible for the fan blades to be mounted well above the lowermost limits of the housing. This latter feature coupled with the substantial inward spacing of the fan blades from the interior surface of the housing materially reduces the probability of injury due to carelessness of the operator in extending his hands or feet beneath the mower. The operator is further protected by the fact that materials are only being discharged vertically downward, rather than laterally, so that it is impossible for the operator to be injured by foreign objects which are picked up and forcefully thrown by the high speed blades of the mower.

The capability provided by the present invention of mounting the fan blades a desired distance above the lower limits of the housing obviates or at least alleviates the need for the runners and gauge wheels required of many prior art mower designs in order to prevent the cutting blades from scraping the ground in going over small knolls or the like. For example, in typical lateral discharge mowers design requirements dictate that the cutting blades be at or very near the lower extreme of the housing for satisfactory operation. Scalping of the ground can only be prevented in such cases by adding gauge wheels, runners or the like to the housing thereby increasing the cost of the mower.

As previously stated, the secondary mower assemblies 40 and 41 operate in identical fashion to the primary mower assembly just described. Further, the cutting blades of the secondary mower assemblies are arranged such that the paths thereof overlap sufficiently with the primary mower assembly, as indicated in FIGURE 2, so that complete cutting across the full width of the mower is assured. The unique construction of the present mower also obviates any detrimental interaction between the blades of the individual mower, that is, no significant lateral air movement exists to depress materials about to enter an adjacent mowing region. Hence, the ragged and uneven cutting attendant such action is effectively obviated.

What is claimed is:
1. A rotary mower comprising:
   a continuous generally semi-spherical housing means defining a protective open bottom enclosure;
   drive means including a drive shaft mounted for rotation about a predetermined vertical axis substantially centered within said housing means; and
   a plurality of fan blades affixed to said drive shaft for rotation within the housing means and continuously extending from the shaft and having terminal ends spaced inwardly from the interior of the housing means and developing an annular discharge region therewith about the entire peripheral extent of the housing means, cutting means of short length disposed on the leading edges of the fan blades slightly inwardly of the terminal ends thereof so as not to obstruct the flow of cut material past the terminal ends of the fan blades, said fan blades adapted for developing substantially only an upward airflow generally parallel to said predetermined vertical axis for drawing materials to be cut upwardly into the path of said cutting means, said housing means being contoured for deflecting said upward airflow and the cut materials carried thereby outwardly along the curved interior surface of said housing means to discharge downwardly through said discharge region about the annular periphery of the housing means.

References Cited

UNITED STATES PATENTS

| | | | |
|---|---|---|---|
| 1,827,559 | 10/1931 | Beazley | 56—25.4 |
| 1,899,564 | 2/1933 | Frey | 56—25.4 |
| 2,521,972 | 9/1950 | Haglund et al. | 56—25.4 |
| 3,152,431 | 10/1964 | Ott et al. | 56—25.4 |
| 3,400,521 | 9/1968 | Caldwell | 56—25.4 |

ROBERT PESHOCK, Primary Examiner